United States Patent [19]

Lubrano

[11] 3,711,829

[45] Jan. 16, 1973

[54] RECEIVER FOR DATA TRANSMISSION

[75] Inventor: Claude Lubrano, Yerres, France

[73] Assignee: Compagnie Industrielle des Telecommunications Cit-Alcatel, Paris, France

[22] Filed: Oct. 13, 1971

[21] Appl. No.: 188,976

[30] Foreign Application Priority Data

Oct. 13, 1970 France....................7037001

[52] U.S. Cl.....................34/146.1 AX

[51] Int. Cl.....................G06f 11/10

[58] Field of Search........340/146.1, 146.1 AG, 146.1 BA, 340/146.1 AX

[56] References Cited

UNITED STATES PATENTS

| | | | |
|---|---|---|---|
| 3,179,921 | 4/1965 | Arthur | 340/146.1 A X |
| 3,624,603 | 11/1971 | Delcomyn | 340/146.1 BA |
| 3,626,372 | 12/1971 | Chayt | 340/146.1 AG |

*Primary Examiner*—Charles E. Atkinson
*Attorney*—Craig, Antonelli and Hill

[57] ABSTRACT

A device which improves the process of identification of the characters of erroneous data resulting from disturbances in the transmission which includes the evaluation of two successive characters and the determination that both characters are accurate before the first of the two characters will be transferred to the output device.

8 Claims, 7 Drawing Figures

RECEIVER FOR DATA TRANSMISSION

The present invention relates in general to improvements in receivers for data transmission, and more particularly to a device which improves the process of identification of the characters of erroneous data resulting from disturbances in the transmission. The invention is applicable to the transmission of data which operates on a character by character basis with the signaling of the acceptance of each character being sent back from the receiver to the transmitter in the form of an acceptance signal.

In order to allow for the control of a character at the receiving end of a communication or connection transmitting characters having a uniform number of information bits, for example $x$ information bits, it is known to add to the information bits a finite number $n$ of redundancy bits. This number of $n$ redundancy bits is a function of the disturbances forseen in the line, of the length of the information character, of the number of different information characters, and of the residual error ratio which the systems which may possibly be associated with this connection can accept. For this purpose, the transmitting end comprises a logic emission member which, for each character to be emitted appearing in a storage memory, calculates the redundancy bits and adds them to the information bits of the character.

At the receiving end, the information bits relative to one character are accumulated in a buffer memory. A logic receiving member evaluates the accuracy of the character received on the basis of the redundancy bits associated with the information bits and furnishes a decision of either acceptance or rejection. If the decision is favorable, the logic receiving member controls the transfer of the information bits of the character in question from the buffer memory toward the data collector, for example a punch-press; and, at the same time, it sends back by means of an emitter located at the receiving end on a return line an acceptance signal. The emitting end thereafter requests the next-following character which is in its turn evaluated and emitted.

If on the other hand the decision of the logic receiving member is unfavorable, the character contained in the receiving buffer memory is canceled and the emitter of the receiving end sends out a rejection signal, which leads the transmitting end to repeat the character which has just been emitted.

It is obvious that in such a system the adjunction of the n redundancy bits affords a protection against errors but reduces the number of characters transmitted per second. In fact, for $x$ information bits contained in one character there will be transmitted in line one character having the total length $(x + n)$ determining a frequency of character transmission of $N/s = V/(x + n)$, wherein $N$ represents the number of bits transmitted per second.

In order to improve the protection, it is necessary to increase the number $n$ of redundancy bits, but in that case one reduces the frequency of the transmission. It is therefore the object of the present invention to improve the protection against errors without an increase in the normal number of redundancy bits.

It will be shown hereinafter that in certain cases it is possible to improve this protection for the same number of redundancy bits by judging each character received $(i + 1)$ on the basis of the character received previously $(i)$, and by basing the decision of acceptance of the character $(i)$ as correct only if the subsequent character $(i + 1)$ is equally recognized as being correct.

A receiver such as proposed by the present invention thus contains a small number of logic members allowing for an association of successively received pairs of characters and furnishing an order of acceptance of a character $(i)$ of the sequence as correct and acceptable to be stored in memory only if the next-following character $(i + 1)$ of the sequence is also found to be correct. The term successive pairs is to be understood as $(i, i+1), (i+1, i+2), (i+2, i+3) \ldots$ The present invention will now be described in further detail in connection with the accompanying drawings, wherein FIG. 1 is a diagram showing two adjacent characters and a possible distribution of errors;

Figure 1:
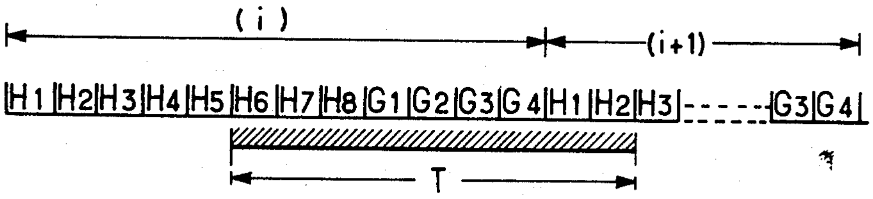

In order to establish the principles of the present invention, it is assumed that each character comprises eight information bits H1 – H8 and four redundancy bits G1 – G4, but it is to be clearly understood that these numerical values have been taken only by way of example. FIG. 1 is a diagram illustrating two successive characters of the sequency $i$ and $(i + 1)$, respectively. The existence of a disturbance T with a duration covering several bits is also assumed.

In the conventional protection process with $n = 4$, the protection P can be 100 percent for a disturbance with a length equal to or smaller than 4. The system proposed by the present invention renders it possible to improve the protection for disturbances having a length greater than or equal to 6.

The present invention is based on the finding that a disturbance can cover two characters and that as a consequence thereof certain errors affecting more than five bits can be detected by taking into account, for example, the acceptance of one character $(i)$ and the rejection of the next-following character $(i + 1)$.

In FIG. 1, a disturbance T has been shown which affects seven bits. The error on the character $(i)$ which affects five bits possibly will not be detected by the conventional arrangement since the detection capacity of the code is entirely certain only up to disturbances having a length 4 bits. Hence the character $(i)$ which is incorrect is recognized as acceptable. On the other hand, the character $(i + 1)$ which comprises an error affecting two bits will be found to be bad. The redundancy of $(i)$ has been faulty but that of $(i + 1)$ maintains its efficacy.

If $(i)$ and $(i + 1)$ have both found to be good, one may validate $(i)$ with full certainty. On the other hand, if $(i)$ is found good and $(i + 1)$ recognized as bad, there exists a risk of error not detected for $(i)$. Thus, in accordance with this invention the validation of $(i)$ will be refused, transmitting end will be required to repeat the characters $(i)$ and $(i + 1)$.

The improvement is effective for a disturbance greater than five bits; as a matter of fact, when five bits are disturbed they will overlap two characters making possible the individual detection of each disturbed character since none of them has more than four disturbed characters.

Figure 2:
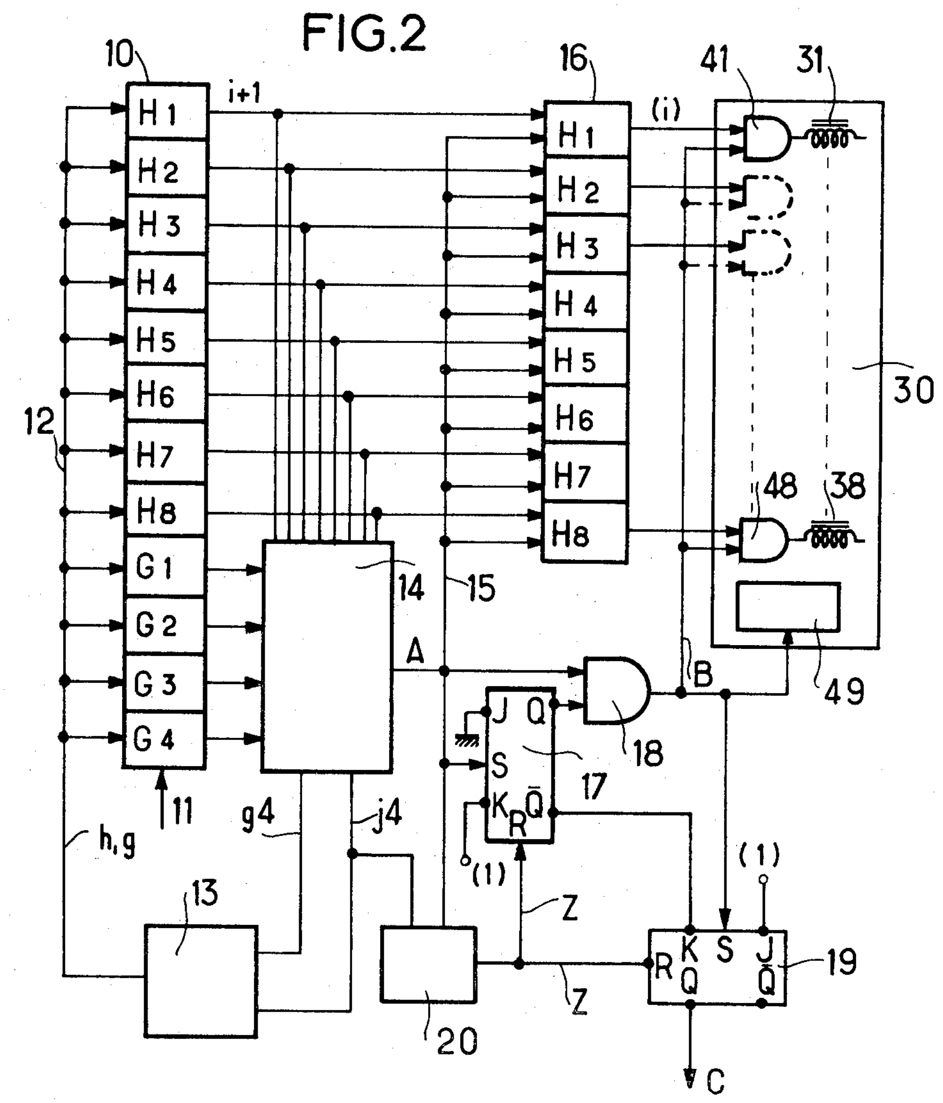
FIG. 2 is a partial schematic diagram of a receiver equipped as proposed by the present invention.

The receiving end of the equipment according to the present invention includes known receiver apparatus which has not been shown and described herein so as to direct this disclosure to details of the invention rather than conventional apparatus. Thus, the invention as seen in FIG. 2 includes a shift register 10 with 12 stages, eight for the information bits, H1 to H8, plus four stages for the redundancy bits, G1 to G4. The information arrives by way of an input 11 and progresses along the shift register under the control of an advance line 12 on which arrive the advancing impulses $h$, $g$, furnished by a clock 13.

A logic circuit 14, which is a conventional redundancy circuit and has not been described in detail herein for that reason, carries out the evaluation of the information in memory in the stages H1 to H8 of register 10 with the aid of the redundancy bits G1 to G4. This control is effected at the instant $g4$ at which the last redundancy bit G4 enters the shift register 10 in response to the control timing signal $g4$ from clock 13. If the character is assumed to be good, there results the generation of a signal A which is emitted at a time $j4$ which is slightly delayed with respect to time $g4$ (see FIG. 3).

The signal A, which is employed for several purposes, causes the transfer of the contents from the stages H1 to H8 of the register 10 into the stages H1 to H8, respectively, of a register 16 operating as a buffer memory. The inputs of the stages of the same order are connected with each other. The transfer operation from the register 10 to the register 16 is controlled via line 15 which receives the aforementioned signal A and employs it to establish communication between the stages of the same order of the two registers.

At regular and repetitive intervals there is contained in the register 10 all the information pertaining to the character $(i + 1)$ plus the redundancy bits, and at the same time the information of the character $(i)$ is stored in the register 16. The apparatus comprises moreover an authorization flip-flop 17 of the "JK" type, an AND gate 18, a signaling JK flip-flop 19, a circuit 20 for controlling the resetting to zero of the flip-flops 17 and 19, and a data collector 30, for example a paper tape perforator.

The authorization flip-flop 17 has the input J thereof connected to ground, the input K at logic level $l$, the input S receives the signal A, the input R receives the signal Z for resetting to zero the flip-flops 17 and 19. The AND gate 18 receives on one input thereof the signal A, while the other input thereof is connected with an output terminal Q of the aforementioned flip-flop 17. The gate 18 furnishes a signal B at the output thereof.

The signaling flip-flop 19 has its input J at logic level $l$; and the input K is connected to the output $\bar{Q}$ of the flip-flop 17. The input S of flip-flop 19 receives the output signal B of the AND gate 18 and the terminal R thereof receives the signal Z for resetting to zero. The output terminal Q of the flip-flop 19 emits a communication signal C indicating acceptance to the transmitter end. The circuit 20 for resetting to zero receives the impulse $j4$ and the signal A, and furnishes the signal Z for resetting to zero the flip-flop 17 and the flip-flop 19.

The data collector, which is shown herein as a paper tape perforator 30, comprises eight punches 31 to 38 which have been symbolically shown by means of the controlling electromagnets thereof. The logical signals existing in the stages H1 to H8 of the register 16 are utilized as the control for these electromagnets, respectively, and are applied thereto by means of eight AND gates 41 to 48 all of which receive in parallel the output signal B of the AND gate 18. The same signal B is applied to a perforating member for the advance control of the band 49 which is present in the paper tape perforator 30, as is well known in the art.

The operation of the system is as follows. When a character i has been recognized as good by the logic member 14, the flip-flop 17 provides a 1 at its output Q in response to the signal A, which will be distinguished by the notation A$(i)$. The AND gate 18 thus has a 1 applied to one input. When the character $(i + 1)$ has been recognized as good in its turn, the logical member 14 emits a second signal A$(i + 1)$ which, applied to the second input of the AND gate 18, gives rise to a signal B which, on the one hand, effects transfer of the character $i$ to the perforator 30 in control thereof and, on the other hand, positions the flip-flop 19 in a manner such as to emit an acceptance signal C which is applied to the transmitter.

If the successive signals A are positive, the flip-flops 17 and 19 are retained in their activated position. If the signal A is negative for any character, the member 20 causes the resetting to zero of the two flip-flops at the time $j4$ in a manner described below.

Figure 3:
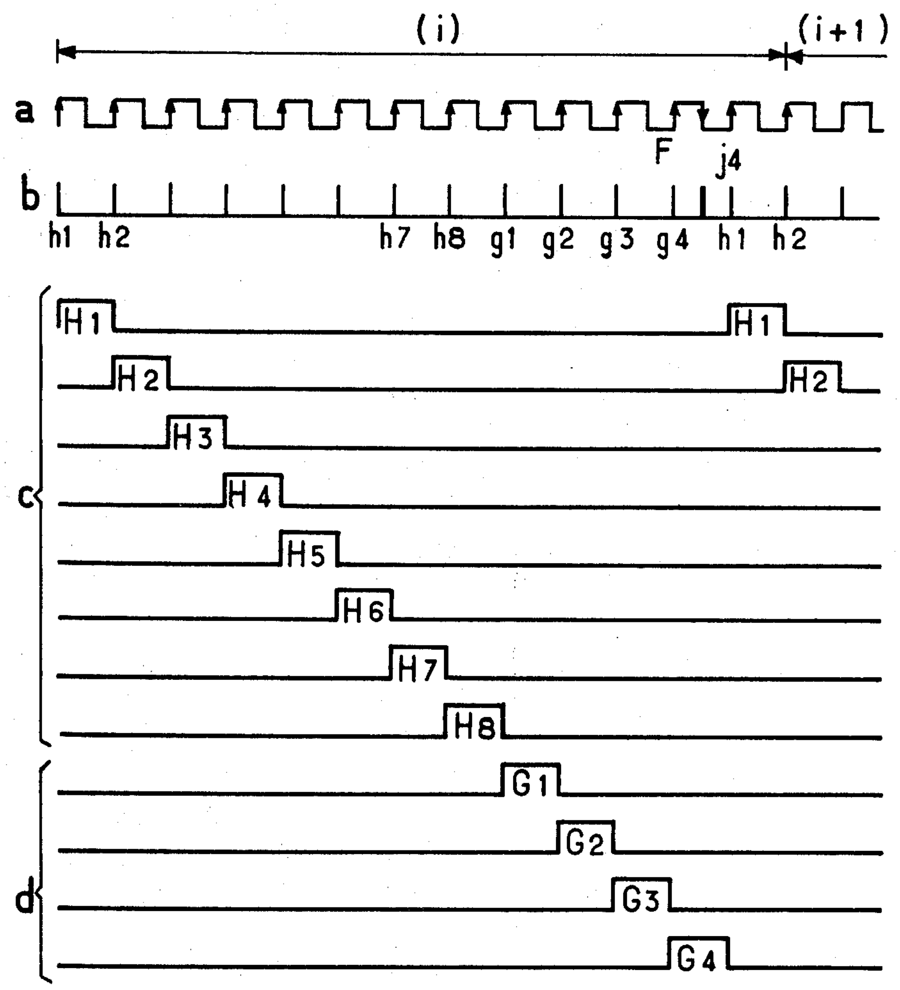
FIG. 3 is a waveform diagram showing different signals utilized in the circuit of the present invention.

FIG. 3 contains a first waveform in line $(a)$ showing the square waves emitted by the clock 13 (FIG. 2). On the rising fronts, for example, which have been marked by means of upwardly pointing arrows, there are emitted fine impulses, shown in line $(b)$, which determine the instant of the beginning of the pulses, $h1$ to $h8$, for the information characters H1 to H8, and the pulses $g1$ to $g4$, for the redundancy bits G1 to G4, these different bits having their positions marked in lines $(c)$ and $(d)$, respectively. The 12 first bits are those of the character $(i)$, and to the right thereof in FIG. 3 are the first bits of the character $(i + 1)$.

Figure 4:
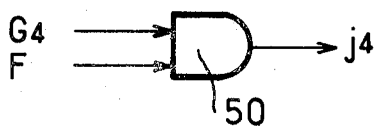
FIG. 4 is a schematic diagram of a logic element for generating an impulse appearing in the circuit of FIG. 3.

The impulse $j4$ mentioned in connection with FIG. 2 appears between the $i$ pulse $g4$ of the last bit of a character and the impulse $h1$ of the first bit of the next-following character. FIG. 4 shows how the impulse $j4$ is produced by an AND gate 50, which receives on its one input the bit G4 and on the other input thereof a fine impulse coming from the descending front marked F in FIG. 4, line $(a)$.

Figure 5:
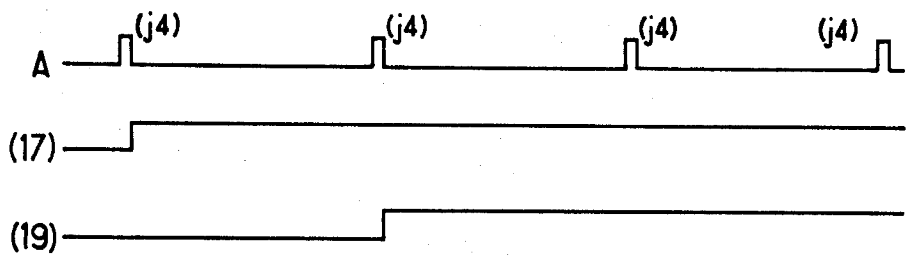
FIG. 5 is a waveform diagram illustrating signals as they appear in the case of good characters.

FIG. 5 contains three lines of waveforms corresponding to a succession of good characters. The line A shows the form of the signal A emitted by the logic member 14 (FIG. 2) at successive instants $j4$. The line marked (17) shows, for example, as the result of a starting operation that the flip-flop 17 is operated on the trailing edge of A and remains operated afterward by confirmation. Under these conditions, flip-flop 17 indicates authorization of transfer.

The line marked (19) indicates the form of the acceptance signal returned to the transmitter in response to the signal B (FIG. 2) applied to flip-flop 19. At the same time the signal B orders the transfer of the first character to the data collector.

Figure 6:
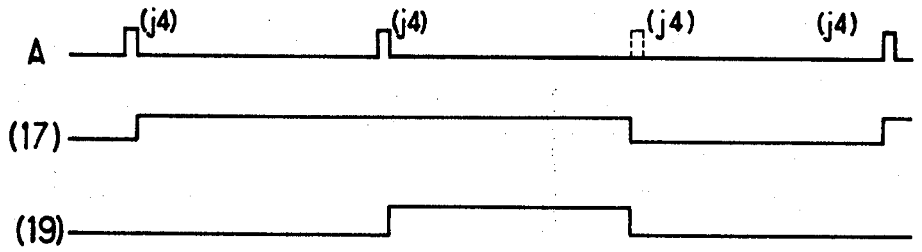
FIG. 6 is a waveform diagram corresponding to FIG. 5 for the case where a character has been found to be erroneous.

FIG. 6, which contains waveforms corresponding to those in FIG. 5, refers to the case where a character is not recognized as good. The first signal A sets the flip-flop 17, the second signal A maintains the flip-flop 17 in the set condition and sets the flip-flop 19, resulting in transfer of the first character. At the time *j*4 which follows, there is no character A; accordingly, the affected character is bad. It is then that the device 20 for resetting to zero enters into play. The two flip-flops 17 and 19 are reset to zero, again so there is neither transfer of data nor signaling of acceptance to the transmitter.

The transmitter is required to emit in this case once again the character which has been recognized to be bad and the character which preceded it.

Figure 7:
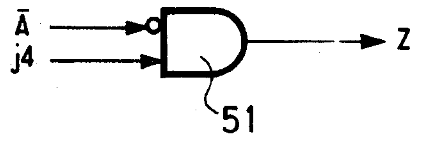
FIG. 7 is a schematic diagram of a logic element for the generation of a signal for resetting to zero various elements of the circuit of FIG. 3.

FIG. 7 shows a preferred embodiment of the device for generating the signal Z for resetting to zero. It is a simple AND gate 51 having an inhibiting input on which arrives the signal $\bar{A}$. Upon receipt of the impulse *j*4 which arrives on the other input of the AND gate 51, a signal Z is emitted if there is no signal $A$ ($\bar{A} = 1$). If there is a signal $A$ ($\bar{A} = 0$), the gate will not emit a signal Z.

It is obvious from the foregoing description that the present invention effectively improves the protection against errors in a large number of cases where the transmission errors cannot be detected by the logical member using the $n$ redundancy bits, i.e., where the duration of a disturbance exceeds $n + 1$ bits, distributed over two characters. This additional protection does not slow down the output of data since the number of redundancy bits is not increased.

In the case of a character which has been recognized as erroneous, the signaling over the return line causes the repetition of a certain number of characters by the transmitting end. In such a case it is current practice to first emit several so-called "synchronization" characters, and then a number of information characters, which takes into account the difference in time of propagation between the path or route of transmission, which is fast, and the return path, which is slower. The result thereof is that, in the known technique, the transmitting end re-emits a relatively significant number of characters. According to the present invention, the re-emission affects in principle one character more. In practice the result thereof is a supplemental duration of the re-emission which is absolutely negligible.

It is known, in a code where each character comprises $x$ information bits plus n redundancy bits, to use as a supplement for $2^x$ characters of the code certain "out of series" characters which assigns combinations $x + n$ to service informations. This process weakens the protection against errors since it is possible that one erroneous information character is accepted as an "out of series" character. Within the framework of the present invention this drawback is avoided by virtue of the fact that an "out of series" character is emitted twice in succession and is not validated until after it has been recognized as being good twice in succession.

What is claimed is:

1. A receiver for the transmission of multi-bit characters of data each including information bits and at least one redundancy bit providing for improved protection against errors comprising
   - input storage means for storing all of the bits of one character at a time,
   - logic circuit means for evaluating the accuracy of the bits stored in said input register means and generating a transfer signal when the character is found to be accurate,
   - a load device operative in response to receipt of the information bits of a character of data,
   - buffer storage means for storing all of the information bits of one character at a time,
   - first transfer means responsive to said transfer signal of said logic circuit means for transferring the information bits from said input storage means to said buffer storage means,
   - second transfer means for transferring the information bits in said buffer storage means to said load device, and
   - control means responsive to said logic circuit means for actuating said second transfer means only upon receipt of two transfer signals in succession.

2. A receiver as defined in claim 1 further including acceptance means responsive to said control means for generating an acceptance signal.

3. A receiver as defined in claim 2 wherein said control means includes a storage element connected to the output of said logic circuit means and an AND gate having one input connected to the output of said logic circuit means and a second input connected to said storage element, the output of said AND gate being connected to said second transfer means in control thereof.

4. A receiver as defined in claim 3 wherein said control means further includes resetting means responsive to absence of a transfer signal at the output of said logic circuit means at the end of the transmission of a character for clearing said acceptance means and said storage element.

5. A receiver as defined in claim 4 wherein said storage element is a flip-flop having its control input connected to the output of said logic circuit means.

6. A receiver as defined in claim 5 wherein said acceptance means is an additional flip-flop having its control input connected to the output of said AND gate.

7. A receiver as defined in claim 1 wherein said control means includes a storage element connected to the output of said logic circuit means and an AND gate having one input connected to the output of said logic circuit means and a second input connected to said storage element, the output of said AND gate being connected to said second transfer means in control thereof.

8. A receiver as defined in claim 7 wherein said storage element is a flip-flop having its control input connected to the output of said logic circuit means.

* * * * *